United States Patent

[11] 3,634,643

| [72] | Inventor | Louis F. Himmelman<br>28 Arrowhead Drive, Upper Saddle River, N.J. 07458 |
|---|---|---|
| [21] | Appl. No. | 96,475 |
| [22] | Filed | Dec. 9, 1970 |
| [45] | Patented | Jan. 11, 1972<br>The portion of the term of the patent subsequent to June 23, 1987, has been disclaimed. |

[54] GAS-SHIELDED WATER-COOLED ELECTRIC WELDING TORCH
9 Claims, 3 Drawing Figs.

[52] U.S. Cl............................................ 219/75,
251/261
[51] Int. Cl............................................. B23k 9/16
[50] Field of Search............................ 137/DIG. 2;
251/261; 219/75

[56] References Cited
UNITED STATES PATENTS

| 3,516,639 | 6/1970 | Himmelman........... | 251/367 |
|---|---|---|---|
| 3,238,350 | 3/1966 | Klasson et al........... | 219/75 |

*Primary Examiner*—J. V. Truhe
*Assistant Examiner*—Hugh D. Jaeger
*Attorney*—James J. Cannon

ABSTRACT: A gas-shielded water-cooled electric welding torch having a rotary gas control and shut-off valve is described. The rotary mechanism of the valve is received in a transverse cylindrical bore formed in the torch body portion, an extension of which serves as a handle when the torch is manually operated. Construction is such that the rotary control handle of the valve may be placed at either side of the torch, depending upon in which direction it is inserted in the cylindrical opening. The body portion of the torch is also provided with longitudinal bores serving as conduit means for circulating coolant water through the torch head.

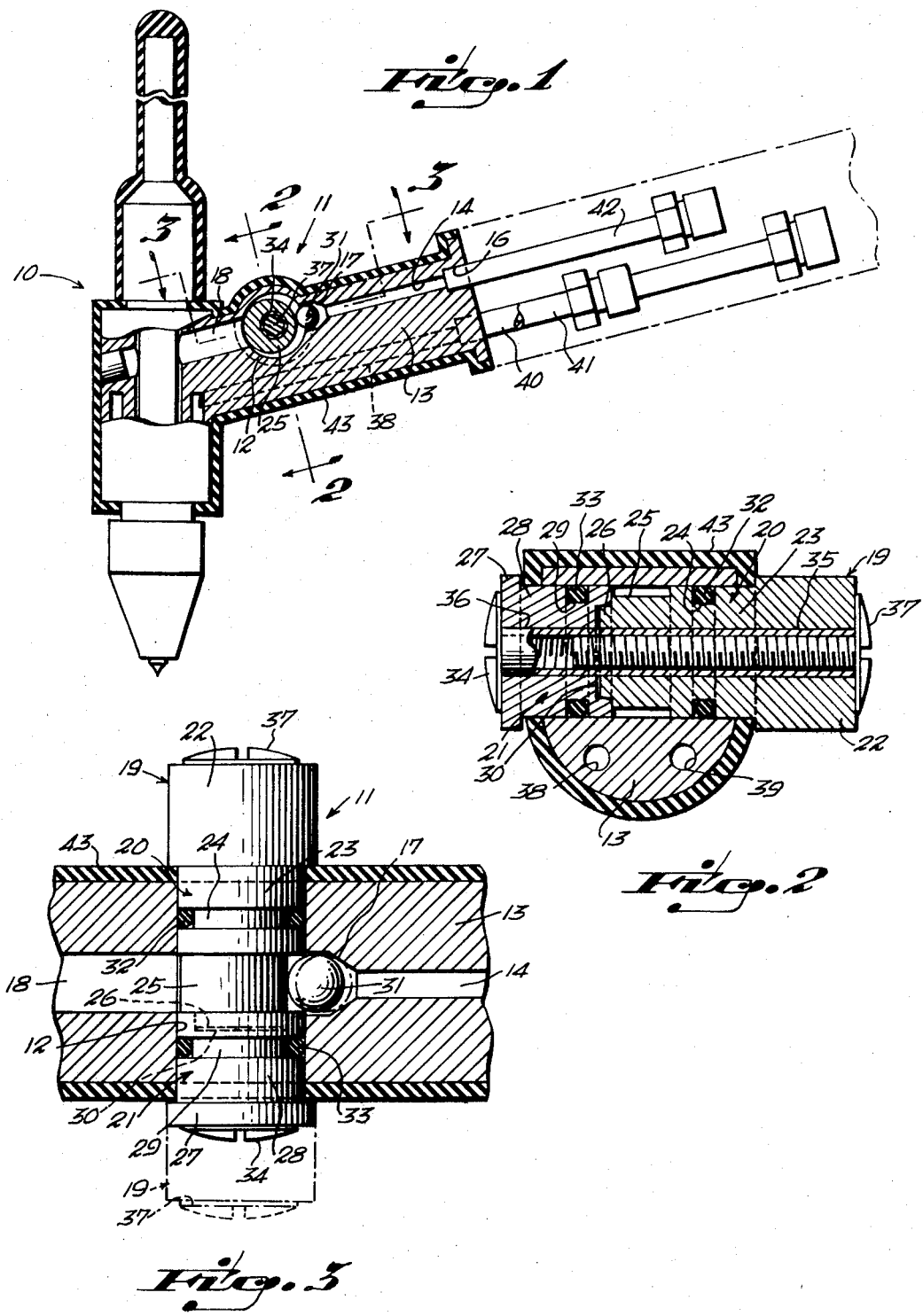

GAS-SHIELDED WATER-COOLED ELECTRIC WELDING TORCH

This invention relates to electric welding and is directed particularly to improvements in gas-shielded electric welding torches for hand use or for use in welding machines.

In my U.S. Pat. No. 3,250,889, issued May 10, 1966 and in my U.S. Pat. No. 3,516,639 issued June 23, 1970 I described lightweight welding torches for welding thin sheet metal in an inert gaseous atmosphere. The present invention has for its principal object the improvement of such torches by the unique combination of mechanical feature described in the above-mentioned patents. More specifically, the present invention has among its features of novelty, an improved rotary gas control valve which extends transversely in the body of the torch, perpendicular to the center line of the gas inlet bore to the torch head.

A salient feature of the present invention resides in the fact that the handle portion of the valve can be mounted either at the left or right-hand side of the torch body, depending upon its direction of assembly thereto, to readily accommodate to use by left or right-handed welders when the torch is being manually controlled.

Yet another object of the invention is to provide an improved torch of the character described wherein the control knob presents the least obstruction to the line of sight while welding.

Still another object is to provide an improved welding torch of the above nature which will be simple in construction, economical to manufacture, compact, well adapted to seam welding, either by hand or by machine, and which will be foolproof in operation, easy to manipulate and long-wearing in use.

Other objects, features and advantages of the invention will be apparent from the following description when read with reference to the accompanying drawings. In the drawings, wherein like reference numerals denote corresponding parts throughout the several views:

FIG. 1 is a side elevational view of a welding torch embodying the invention, shown partly in section;

FIG. 2 is a vertical cross-sectional view taken along the line 2—2 of FIG. 1 in the direction of the arrows; and FIG. 3 is a horizontal cross-sectional view taken along the line 3—3 of FIG. 1 in the direction of the arrows.

Referring now in detail to the drawings, reference numeral 10 designates, generally, an electric torch of the type described in my above-mentioned U.S. Pat. No. 3,250,889, differing principally in being equipped with the improved gas control valve comprising the invention, indicated generally at 11. The gas control valve 11 is received in a transverse cylindrical bore 12 provided in the integrally formed, outwardly extending and somewhat upwardly inclined torch body portion 13. The outer end of the body portion 13 is longitudinally drilled to provide a gas inlet conduit 14 the inner end of which communicates with the transverse cylindrical bore 12 at a central position therealong. The gas inlet conduit 14 is counter-bored at its outer end, as indicated at 16, for the purpose hereinafter appearing. The inner end of the gas inlet conduit 14 is chamfered, as indicated at 17, to provide a frustoconical chamber defining a valve seat, as is hereinbelow more particularly described. The torch body portion 13 is also provided with a gas outlet bore 18, coaxial with the gas inlet conduit bore 14 and communicating between transverse cylindrical bore 12 and the torch head to provide controlled gas flow thereto during welding. It is to be noted that besides being coaxial, the gas flow conduit bores 14 and 18 have a common axis which is coplanar with the axis of generation of the transverse cylindrical bore 12.

The gas control valve also comprises a valve stem assembly 19 comprising first valve stem section 20 and a second valve stem portion 21. Preferably, the valve stem sections 20 and 21 are machined of "Fluorocarbon Resin" to resist heat. As is best illustrated in FIGS. 2 and 3, the first valve stem section 20 is integrally formed with a cylindrical handle portion 22 extending into a reduced-diameter portion 23 provided with an annular groove 24 for the seating therein of a sealing O-ring as hereinafter described. The reduced-diameter portion 23 of the first valve stem section 20 extends into an eccentric cylindrical portion or cam 25 the outer end of which terminates in a short, circular-tapered key portion 26 concentric with the handle portion 22 and reduced-diameter portion 23. The second valve stem section 21 is integrally formed with a short, cylindrical outer end portion 27 extending into a comparatively long reduced-diameter portion 28 formed with an annular groove 29 for the reception therein of a second sealing O-ring, as hereinafter described. The outer end of the reduced-diameter portion 28 of the second valve stem section 21 is formed with a concentric, tapered annular recess 30 adapted to receive, in complementary interfitting engagement upon assembly, the tapered key portion 26 of the first valve stem section 20.

Referring now to FIGS. 1 and 3, it will be seen that a spherical ball check 31 is disposed within the frustoconical valve seat 17 and that the first and second valve stem sections 20 and 21 are assembled together within the transverse cylindrical bore 12 of the torch body portion 13 so that the protruding portion of the ball check 31 is received within the eccentric circular groove afforded by the cam portion 25 of said first valve stem section.

In assembly, the ball check 31 will first be placed in its valve seat 17, after which the first valve stem section 20, fitted with an O-ring 32, will be inserted in place through one end of the transverse cylindrical bore 12. Next, the second valve stem section 21, equipped with O-ring 33, will be inserted through the other end of the transverse cylindrical bore 12 in interfitting engagement with the first valve stem section 20, viz, with the tapered key portion 26 of the first valve stem section snugly received within the complementary tapered recess 30 of the second valve stem section. The assemblage is held together by means of an internally threaded sleeve nut 34 received through coaxial bores 35 and 36 in the first and second valve stem sections 20, 21, respectively, retained by a machine screw 37 extending through the first valve stem section 20.

As illustrated in FIG. 1 the torch body portion 13, in addition to the above-described inlet conduit bore 14, is provided with inlet and outlet water circulation bores 38 and 39 the outer ends of which are fitted with flexible metal conduits 40, 41, respectively, for connection with inlet and outlet water supply lines for cooling the torch, as is more particularly described in my above-mentioned U.S. Pat. No. 3,250,889. As further described in this patent, (and therefore not further illustrated or described herein), the outer end of the gas inlet conduit 14 is fitted with a short length of conduit 42 having a fitting at its outer end connectable with a gas and electric conduit assemblage.

Preferably, the torch body portion 13, as well as portions of the torch head itself, are provided with an insulating jacket 43 which may be comprised of material having a high dielectric strength as well as good heat-insulating qualities, such as a phenolic material or bonded silicone rubber.

In operation, turning of the cylindrical handle portion 22 of the valve stem member 20 will correspondingly rotate its cam portion 29 to move the check ball 31 between seated and unseated positions within its frustoconical valve seat 17. As illustrated in FIGS. 1 and 3, when the valve stem section 20 is in such position that the cam groove has its widest portion facing the ball check 31, said ball check will be moved outward of its seat under the pressure of incoming gas, which gas will flow around the cam groove and through the gas flow conduit bore 18. Upon turning the valve stem section 20 180 circular degrees in either direction from its position as illustrated in FIG. 3, the ball check 31 will be gradually moved from its fully opened position as illustrated by the full line representation thereof, into its fully seated position as illustrated by the broken line representation thereof.

It is to be noted that the cam action on the ball check 31 by the valve stem cam portion 25 is so gradual that gas pressure of the inlet side will not cause reversal or self-opening of the valve. The gas sealing O-rings 32 and 33, moreover, which are preferably of a tough, heat-resistant material such as silicone rubber, also afford sufficient friction to prevent self-turning of the valve stem assembly under normal operating conditions. It is further to be noted that the interfitting of the conical key portion 26 of the first valve stem section 20 within the tapered recess 30 of the second valve stem section 21 will be tight enough to prevent the leakage of gas at this juncture.

It is to be noted that although in the drawings the rotary gas control valve is assembled to the torch body portion 13 so that the cylindrical handle portion 22 is located at the right-hand side of the torch as seen from the handle end, the valve mechanism could just as well be reversed in its insertion within transverse cylindrical bore 12 to place said handle portion at the left side, as illustrated by the broken line representation thereof in FIG. 3. It is also to be noted that this reversal can readily be effected by the operator or user of the tool to suit his particular needs.

While I have illustrated and described herein only one form in which the invention can conveniently be embodied in practice, it is to be understood that this form is presented by way of example only and not in a limiting sense. The invention, in brief, comprises all the embodiments and modifications coming within the scope and spirit of the following claims.

What I claim as new and desire to secure by Letters Patent is:

1. A gas-shielded water-cooled electric welding torch comprising a torch head, an elongated torch body member extending outwardly of said torch head to one side thereof, said body member having longitudinally extending water inlet and water outlet and gas inlet passageways, a cylindrical bore extending transversely through said body member and communicating at opposite interior sides thereof with said gas inlet and gas outlet passageways, a frustoconical valve recess formed at the communicating juncture between said gas inlet passageway and said laterally transverse bore, and a ball check within said valve recess, a valve stem member rotatably received within said transverse bore, said valve stem member having cam means in register with said ball check operative, upon rotation of said valve stem member to move said ball check between unseated and seated positions with respect to said valve seat recess, said cam means comprising a cylindrical cam portion eccentric with respect to said transverse bore and defining a cam groove within which said ball check is partially received, said valve stem member comprising a pair of transversely divided first and second valve stem sections, said first section comprising said cylindrical cam portion, and means for bolting said first and second valve stem sections together within said transverse bore.

2. A gas-shielded water-cooled electric welding torch as defined in claim 1, wherein said gas inlet and gas outlet passageways are coaxial along an axis perpendicularly bisecting the axis of said cylindrical transverse bore.

3. A gas-shielded water-cooled electric welding torch as defined in claim 2, wherein said cylindrical transverse bore and said gas inlet and gas outlet passageways comprise drilled openings in said torch body member.

4. A gas-shielded water-cooled electric welding torch as defined in claim 3, including means for conducting a coolant through said body member for cooling the torch head, said coolant-conducting means comprising a pair of passageways extending longitudinally through said body member.

5. A gas-shielded water-cooled electric welding torch as defined in claim 3, wherein said bolting means comprises a sleeve nut extending through axial bores in said first and second valve stem sections and a machine screw threaded in said sleeve nut.

6. A gas-shielded water-cooled electric welding torch as defined in claim 5, including means for securing said valve stem sections in end-to-end interfitting engagement.

7. A gas-shielded water-cooled electric welding torch as defined in claim 5, wherein said securing means comprises a short, tapered cylindrical key portion formed on one of said valve stem sections receivable in a complementary tapered circular recess in the other of said valve stem sections.

8. A gas-shielded water-cooled electric welding torch as defined in claim 5, including means for individually sealing said first and second valve stem sections with respect to said transverse bore.

9. A gas-shielded water-cooled electric welding torch as defined in claim 8, wherein said sealing means comprises resilient O-rings seated within annular grooves provided in said first and second valve stem sections.

* * * * *